(12) United States Patent
De Bruin et al.

(10) Patent No.: US 9,144,059 B2
(45) Date of Patent: Sep. 22, 2015

(54) SUPER SCHEDULING CONTROL CHANNEL

(75) Inventors: Peter De Bruin, Gammelstad (SE); Bo Hagerman, Tyresö (SE); Sara Landström, Luleå (SE); Arne Simonsson, Gammelstad (SE); Bogdan Timus, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 145 days.

(21) Appl. No.: 13/993,254

(22) PCT Filed: Dec. 13, 2010

(86) PCT No.: PCT/SE2010/051367
§ 371 (c)(1),
(2), (4) Date: Jun. 11, 2013

(87) PCT Pub. No.: WO2012/082023
PCT Pub. Date: Jun. 21, 2012

(65) Prior Publication Data
US 2013/0279461 A1    Oct. 24, 2013

(51) Int. Cl.
*H04Q 7/00* (2006.01)
*H04W 72/04* (2009.01)
(Continued)

(52) U.S. Cl.
CPC .......... *H04W 72/04* (2013.01); *H04W 72/0426* (2013.01); *H04W 16/32* (2013.01); *H04W 92/20* (2013.01)

(58) Field of Classification Search
USPC ..................................... 455/422.1
See application file for complete search history.

(56) References Cited

U.S. PATENT DOCUMENTS

| 2009/0040972 A1 | 2/2009 | Robson et al. |
| 2010/0238888 A1 | 9/2010 | Sampath et al. |

(Continued)

FOREIGN PATENT DOCUMENTS

| WO | 2009129413 A1 | 10/2009 |
| WO | 2009152866 A1 | 12/2009 |
| WO | 2010150952 A1 | 12/2010 |

OTHER PUBLICATIONS

3rd Generation Partnership Project. 3GPP TR 36.922 V9.1.0 (Jun. 2010). 3rd Generation Partnership Project;Technical Specification Group Radio Access Network;Evolved Universal Terrestrial Radio Access (E-UTRA); TDD Home eNode B (HeNB) Radio Frequency (RF) requirements analysis (Release 9). Jun. 2010. pp. 1-74.

(Continued)

*Primary Examiner* — Duc C Ho
(74) *Attorney, Agent, or Firm* — Murphy, Bilak & Homiller, PLLC

(57) ABSTRACT

A method and arrangement for enabling communication of data between a UE and a first base station in a cellular communication network further comprising the second base station, and the second base station is connected to the first base station via a communication interface. A scheduling request is received from the first base station. The scheduling request is based on a suggested scheduling which is determined by the first base station, and the suggested scheduling concerns the communication of data. Scheduling information is determined based on the scheduling request, and the scheduling information is transmitted to the UE. By determining a suggested scheduling in a micro base station, but transmitting scheduling information from an overlaying macro base station, local awareness of communication conditions may be applied, and interferences from neighboring micro base stations may be decreased.

22 Claims, 8 Drawing Sheets

(51) Int. Cl.
*H04W 16/32* (2009.01)
*H04W 92/20* (2009.01)

(56) References Cited

U.S. PATENT DOCUMENTS

2011/0110251 A1* 5/2011 Krishnamurthy et al. .... 370/252
2011/0250892 A1* 10/2011 Gupta et al. .................. 455/437
2011/0319066 A1* 12/2011 Chou et al. ................ 455/422.1
2012/0093095 A1* 4/2012 Barbieri et al. ............... 370/329

OTHER PUBLICATIONS

Bharucha, Z. et al. Dynamic Resource Partitioning for Downlink Femto-to-Macro-Cell Interference Avoidance. EURASIP Journal on Wireless Communications and Networking. Apr. 26, 2010. pp. 1-12. vol. 2010. Hindawi Publishing Corporation.

* cited by examiner

SUPER SCHEDULING CONTROL CHANNEL

TECHNICAL FIELD

The present disclosure relates generally to scheduling of data transfers in cellular communication networks. In particular, the disclosed arrangement and methods can be used in heterogeneous cellular communication networks.

BACKGROUND

In 3GPP (3$^{rd}$ Generation Partnership Project), the packet-switched communication systems HSPA (High Speed Packet Access) and LTE (Long Term Evolution) have been specified for wireless transmission of data packets between User Equipments and radio base stations in cellular/mobile networks. In this description, the term "User Equipment" (UE) will be used to denote any suitable communication terminal adapted to communicate with a radio base station. A UE, may be implemented as a mobile phone, a PDA (Personal Digital Assistant), a handheld computer, a laptop computer, etc. A "radio base station" may be implanted as a NodeB, an eNodeB, a repeater, etc.

A base station serving a cell in a wireless network may transmit user data and control data in a physical downlink channel to a UE, and a UE may likewise transmit data and control data in a physical uplink channel in the opposite direction to the base station.

With the emergence of telecommunication services, so called heterogeneous networks have been developed. In heterogeneous networks there is a mix of differently sized cells served by base stations, such as macro, micro, pico, femto, and other type of devices such as relays and repeaters. For instance, a UE that is located within the coverage area of a macro radio base station, or partially within the coverage of the macro base station, may be served by a micro radio base station, which coverage area is a subset of the coverage of the macro radio base station. For example, even if an office building or department of a company is located within the coverage area of a macro base station, UE's of the employees will be served by an own micro radio base station of the company when being present in the office building/department. When being present outside the office building/department, the UE's of the employees are instead served by the macro base station. Typically, UE's for visitors to the office are not served by the micro radio base station, but are instead served by the macro base station.

In this description, the term "macro base station" is used to denote the radio base station which serves a larger "macro cell", which overlaps or partially overlaps a "micro cell". The term "micro base station" will be used to denote the radio base station which is serving the micro cell. Moreover, the terms "micro cell" and "micro base station" shall be interpreted generic, and are in this description used to denote any communication cell, and its respective radio base station, which is overlapped or partially overlapped by a macro cell. Thus, the terms micro cells and micro base stations are not limited to only micro cells and micro base stations, respectively, also pico cells, femto cells, and their respective radio base stations will be covered by these terms.

With "physical control channel" is meant physical channels which are used for communication of control data, e.g. scheduling initiations and decisions. In LTE, such physical control channels are e.g. PDCCH's (Physical Downlink Control Channel), and PUCCH's (Physical Uplink Control Channel)), which are used for communication of control data in downlink and uplink, respectively. With "physical shared channel" is meant physical shared channels which are used for communication of data. In LTE, such physical shared channels are e.g. PDSCH's (Physical Downlink Shared Channel), and PUSCH's (Physical Uplink Shared Channel), which are used for communication of data between communication terminals and radio base stations in downlink and uplink, respectively.

With reference to FIG. 1, a heterogeneous communication network will now be described. The micro cell 102 is served and controlled by a micro base station 104. One or more UE's 100 are served by the micro base station 104 and are scheduled by the micro base station 104 to receive downlink data from the micro base station 104. Scheduling information is sent on a downlink control channel 106, from the micro base station 104 to the UE 100, e.g. on a PDCCH. For instance, the scheduling information defines when downlink data will be sent. Downlink data is then sent on a shared channel 108 according to the scheduling information, e.g. on a PDSCH. The micro cell 102 is further embedded in a macro cell 112, and the macro cell 112 is served and controlled by a macro base station 114. One or more UE's 110 are served by the macro base station 114 and are scheduled by the macro base station 114 to receive downlink data from the macro base station 114. Scheduling information is sent on a downlink control channel 116 from the macro base station to the UE 110, e.g. on a PDCCH (Physical Downlink Control CHannel). Downlink data is then sent on a shared channel 118 according to the scheduling information, e.g. on a PDSCH (Physical Downlink Shared CHannel).

In the FIG. 1, communication of downlink data from the radio base stations 104, 114 to the UE's 100, 110 is described. However, communication of uplink data is performed similarly, even if the UE's 100, 110 requests their respective base station 104, 114 to schedule them to send the uplink data on uplink data channels (not shown in the figure), e.g. PUSCH's (Physical Uplink Shared CHannel). The requests are sent to the respective base station 104, 114 on uplink control channels (not shown in the figure), e.g. PUCCH's (Physical Uplink Control CHannel).

Typically, a heterogeneous communication network comprises various radio base stations having different capabilities and different downlink transmission power levels. For example, the output power difference between macro sites and micro or pico sites can be 10-20 dB, or even more. Therefore these radio base stations may have different coverage ranges. Hence the cells which they serve have different sizes, since the cell size is typically determined by the downlink transmission power, particularly on the reference symbols sent by the base stations.

In the uplink, the transmission power is, in principle, independent of the base station type and depends only on the UE (User Equipment) power capability. In the uplink, the UE should ideally be served by the base station which receives the strongest signal power from the UE, which typically is the base station with the shortest distance to the UE. Hence in the uplink the cells size should ideally not be based on the base station's power capabilities.

Hence in heterogeneous communication networks with smaller cells (micro, pico, femto, etc.) being overlapped or partially overlapped by a larger cell (macro), the optimum cell border may be different in downlink and uplink, and the optimal coverage area for the micro cell will be smaller in downlink. For instance, a UE which is located to a micro cell for best uplink coverage and served by a micro base station will receive signalling information (control data) from the micro base station. Generally, micro base stations transmit signalling information with a lower output power than macro base stations. Thus, even if the UE is served by the micro base station and receives signalling information from the micro base station, signalling information from the macro base station will reach the UE in downlink, and because the signalling information is arranged on the same resource elements for all UE's the signalling information, affect the reception of signalling information from the micro base station with interference. Especially, the signalling information to UE's located near the cell border where the macro signalling can be received with higher power level in case of uplink optimal cell association will be affected by interference. For signalling information in uplink, the interference problem will be less severe, due to the fact that the UE sends the signalling information with a substantially lower output effect, and the signalling information from the UE will not reach the macro base station, or be so weak that it does not affect signalling information substantially from other UE's served by the macro base station. Moreover, the user data in uplink and downlink, respectively, may be arranged in such a way that user data for a specific UE will not be affected by user data for other UE's. To arrange the user data, methods as Inter-Cell Interference Coordination (ICIC) may be applied. However, in LTE ICIC is only possible to use on shared channels for user data where frequency resources are orthogonal and not for signalling information on control channels such as PDCCH.

Interference of signalling information is not a major problem if the small and the large cells operate on different radio resources, for instance in a GSM network, because the performance degradation is not severe if the downlink cell association is used also for uplink communication. However, the difference between optimum cell size in the downlink and in the uplink is generally a problem if the two cells operate on the same radio resources (same frequency), for instance in VIE. The reason for this is that the smaller base stations typically use a lower output power than the overlaying macro base station, and the UE's use the same or similar output power. Furthermore, the interference situation for the control channels may be difficult. For example, the PDCCH from a smaller base station may be severely interfered by an overlaying base station.

It is thus generally a problem to provide reliable conditions for the control channels in overlapped cells in heterogeneous communication networks using shared radio resources.

SUMMARY

It is an object to address at least some of the problems outlined above. In particular, it is an object to achieve a robust signalling for UE's in heterogeneous communication networks. These objects and others may be achieved primarily by a solution according to the attached independent claims.

According to one aspect, a method is provided in a User Equipment (UE) for communicating data between the UE and a first base station in a cellular communication network. Furthermore, the cellular communication network comprises a second base station connected to the first base station via a communication interface. In the method, scheduling information is received from the second base station, the scheduling information being related to communication of data between the first base station and the UE. Data is then received from the first base station according to the scheduling information, or data is transmitted to the first base station according to the scheduling information. Furthermore, the scheduling information may define one or more resource blocks to be used for receiving data, or one or more resource blocks to be used for transmitting data. Moreover, the scheduling information may comprise a cell identity and be received on a control channel comprising a carrier identification field adapted to comprise the cell identity, and downlink data may be received based on the cell identity, or uplink data be transmitted based on the cell identity.

According to another aspect, a UE is provided which is adapted to enable communication of data between the UE and a first base station in a cellular communication network. The cellular communication network comprises also a second base station which is connected to the first base station via a communication interface. The UE comprises a controller and a transceiver, where the controller is adapted to receive scheduling information from the second base station. The scheduling information is related to the communication of data. The transceiver is adapted to transmit uplink data according to the scheduling information, or receive downlink data according to the scheduling information. The controller may be further adapted to determine one or more resource blocks based on the scheduling information and the transceiver may be further adapted to use the determined resource blocks for transmitting data or for receiving data.

According to another aspect, a method is provided in a first base station for communicating data between the first base station and a UE in a cellular communication network. The communication network comprises further a second base station which is connected to the first base station via a communication interface. In the method, a suggested scheduling of communication of data is determined, and a scheduling request which is based on the suggested scheduling is transmitted to the second base station. Data is then transmitted to the UE according to a second scheduling, or data is received from the UE according to the second scheduling. The second scheduling may be in accordance with the suggested scheduling, or the second scheduling may be different from the suggested scheduling and over-riding the suggested scheduling.

According to a further aspect, a first base station is provided for enabling communication of data between the first base station and a UE in a cellular communication network which further comprises a second base station being connected to the first base station via a communication interface. The first base station comprises a scheduler which is adapted to determine a suggested scheduling of the communication of data, and a transceiver which is adapted to transmit to the second base station a scheduling request based on the suggested scheduling. The transceiver is further adapted to transmit data according to a second scheduling, and/or the transceiver is further adapted to receive data according to the second scheduling.

According to another aspect, a method is provided in a second base station for enabling communication of data between a UE and a first base station in a cellular communication network which further comprises the second base station. The second base station is connected to the first base station via a communication interface. In the method, a scheduling request is received from the first base station. The scheduling request is based on a suggested scheduling which is determined by the first base station, and the suggested scheduling concerns the communication of data. Scheduling information is determined based on the scheduling request, and the scheduling information is transmitted to the UE. When determining the scheduling information, the scheduling information may be determined in accordance with the suggested scheduling, or in accordance with an over-riding scheduling, being different from the suggested scheduling and determined by the second base station. Furthermore, any of the suggested scheduling and the over-riding scheduling may comprise assignment of a cell identity, and the scheduling information may be transmitted over an extended control channel comprising a carrier indication field adapted to comprise the cell identity.

According to a further aspect, a second base station is provided for enabling communication of data between a UE and a first base station in a cellular communication network which further comprises the second base station. The second base station is connected to the first base station via a communication interface. The second base station comprises a transceiver which is adapted to receive from the first base station a scheduling request in accordance with a suggested scheduling concerning the communication of data. The transceiver is further adapted to transmit scheduling information to the UE. The second base station comprises also a scheduler which is adapted to determine the scheduling information based on the scheduling request. The scheduler may be adapted to determine the scheduling information in accordance with the suggested scheduling, or determine a different over-riding scheduling and determine the scheduling information in accordance with the over-riding scheduling. The scheduler may be further configured to include a cell identity in the scheduling information and the transceiver may be further configured to transmit the scheduling information to the UE on a control channel comprising a carrier identification field adapted to comprise the cell identity.

Because the extended control channel comprises a cell identity, the overlaying macro base station is enabled to distribute scheduling information to UE's in overlapped cells, which decreases interference of the scheduling information from neighbouring micro base stations.

BRIEF DESCRIPTION OF DRAWINGS

Some exemplifying embodiments of methods and arrangement in heterogeneous communication networks will be described, with reference to the accompanying drawings, in which.

DESCRIPTION

Figure 1:
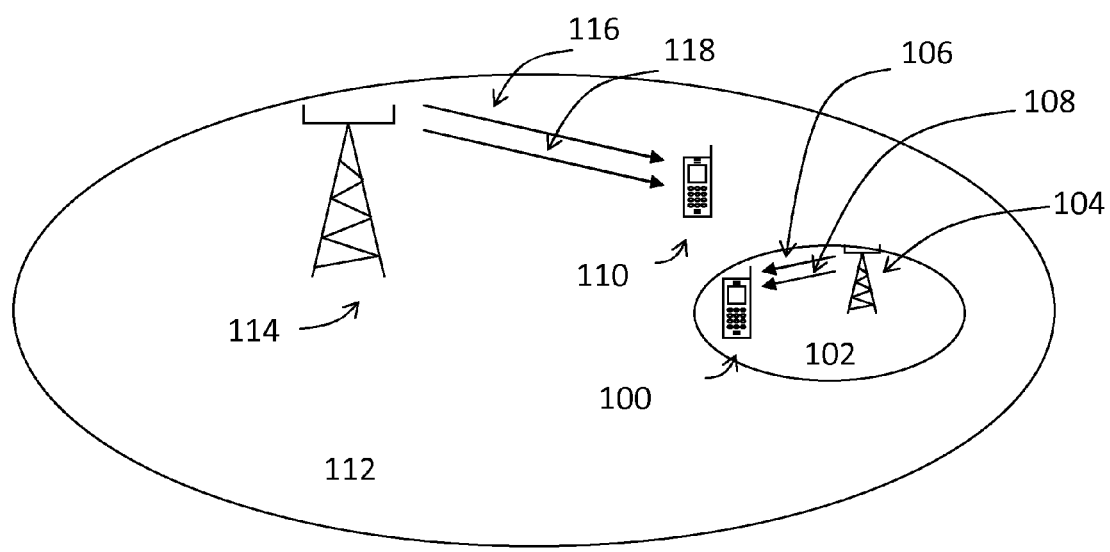
FIG. 1 is an environmental view of a heterogeneous communication network according to the prior art.

The term "Scheduling Initiation" refers in this description to that a macro base station or a micro base station decides that data shall be transferred between a mobile station and a micro base station, and decides that the data will be transferred in a specific resource block (time slot & part of frequency band), i.e. decides when the data transfer will be time scheduled. The term "Scheduling Execution" refers to that a macro base station signals scheduling information according to the scheduling of communication resources to the UE's. With "cellular communication network" is meant a communication network where one or more UE's are served by an access point, e.g. an eNodeB, a nodeB, a base station, etc. Such an access point has a coverage area and UE's located within the coverage area are served by the base station.

A communication channel in a cellular communication may be configured on a data "carrier". In an LTE-system such a data carrier has a bandwidth up to 20 MHz. In future LTE, releases, a larger bandwidth is requested. By using a plurality of component carriers, a communication channel with a larger bandwidth may be achieved.

The term "Scheduling information" contains on what radio resources (time and frequency) a transmission shall take place and the format (modulation, coding, number of codewords, etc.). For LTE the resources are implemented as resource blocks, which are implicitly addressed in time and indexed in the frequency domain. In uplink, "scheduling information" may also be referred to as scheduling grant. A "Scheduling request" comprises typically scheduling information according to a suggested scheduling.

According to an example embodiment, a first base station which has downlink data to transmit to a UE, or will receive uplink data from the UE, initiates scheduling by deciding that the data shall be communicated on a communication link between the first base station and the UE, and sends a scheduling request to the second overlaying/surrounding base station. Today, a plurality of user data transmissions may be scheduled to be communicated simultaneously between embedded base stations and UE's served by the respective embedded base station. However, within current LTE standard only one shared channel (PDSCH or PUSCH) at a time may be scheduled with one control channel (PDCCH). To enable the macro base station to transmit the control data to the UE served by one or more micro base stations at the same time as the macro base station, the downlink control channel from the surrounding base station is extended with a cell indicator adapted to indicate which cell and base station the scheduling information relates to. One possible solution is to use the Carrier Indicator Held (CIO as cell indicator, which is intended for carrier aggregation and addressing of component carrier.

The PDCCH is from the LTE release 10 view "extended" with cell identity. To use CIF is only one example; other suitable solutions for addressing the cells can be used in the manner described. For other accesses than LTE, scheduling information can similarly also be completed with a cell identity.

By determining a suggested scheduling in the micro base station and sending a scheduling request to the macro base station, the macro base station is enabled to co-ordinate transmission of the scheduling information for all cells within its coverage area, when transmitting scheduling information. Thereby, interference from data channels for UE's located in the coverage area of the macro base station may be avoided.

To achieve the flexibility of the scheduling to tackle the interference issues, there is a double cell association, one for data (PDSCH/PUSCH) and uplink control (PUCCH) and another for downlink control (PDCCH). In other words, the UE is associated to the micro base station for communicating uplink and downlink data on the PDSCH/PUSCH and transmitting signalling information on the PUCCH, but is also associated to the macro base station for receiving signalling information on the PDCCH. In one example embodiment, the UE applies the ordinary handover mechanism for the first association (data and uplink control), while for PDCCH the association is only done towards certain cell types (high power nodes). The cell types can be read from the cell broadcast channel or from a modified cell broadcast channel with a new information element explicit indicate type of cell. This additional cell association can be done locally in the mobile only without any additional signalling. With this example embodiment the extended control channel is used within the whole micro cell.

In another example embodiment two handover thresholds are used and signalled to the network, letting the network control the double association. This enables the micro cell to have a PDCCH and schedule users in the centre of the cell where the control channel interference problem is not severe.

Figure 2A:
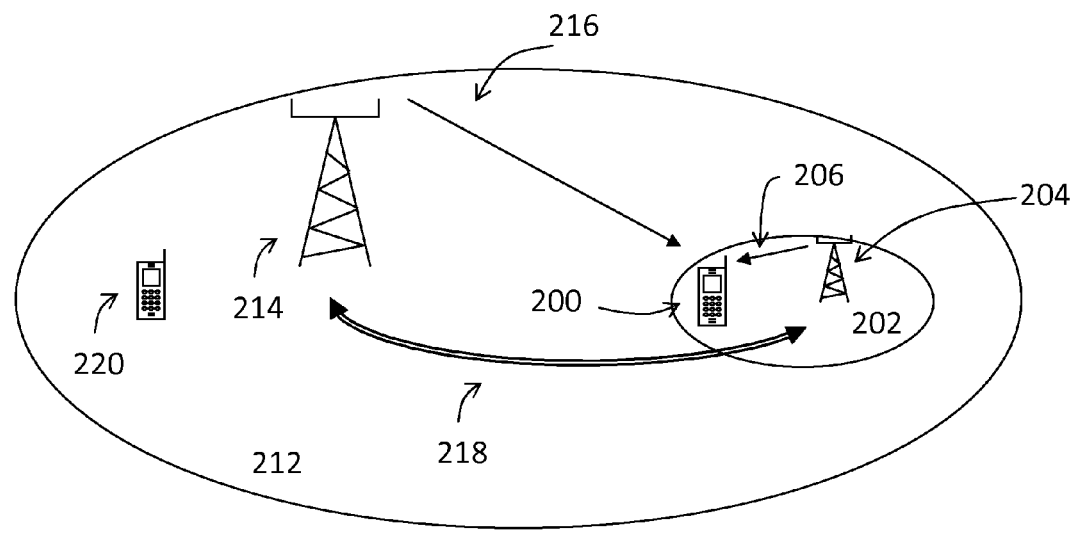
FIG. 2a-b are environmental views of heterogeneous communication networks according to some example embodiments.

With reference to FIG. 2a, which illustrates a schematic overview, a scenario where a UE 200 is scheduled to receive downlink data according to an example embodiment will now be described. In this example embodiment the UE 200 is scheduled to receive downlink data from a micro base station 204.

The UE 200 is located in a micro cell 202 and is served by a micro base station 204. The micro cell 202 is embedded in a macro cell 212, i.e. the coverage area (shown as a smaller ellipsoid) of the micro base station 204 is located within the coverage area (a larger ellipsoid) of a macro base station 214. The macro base station 214 may serve other UE's 220 which are not served by micro base stations 204.

The micro base station 204 is adapted determine a suggested scheduling of downlink data from the micro base station 204 to the UE 200, e.g. by suggesting a resource block for the transmission and transmitting a scheduling request accordingly to the macro base station 214. A communication interface 218 is arranged, via which the scheduling request will be transmitted. In LTE; the communication interface 218 is typically implemented as an X2 interface. However, the concept is not limited to the use of the X2 interface for the transmission; any other suitable communication interface which is able to transmit the scheduling request may be used in the manner described. Furthermore, the scheduling request may be transmitted over any suitable medium, e.g. radio communication networks, cables, optical fibres, etc.

The macro base station 214 is adapted to receive the scheduling request, determine scheduling information based on the scheduling request and send the scheduling information to the UE 200. As described in an example embodiment above, interference of the signalling information will be decreased and therefore the quality is improved by transmitting the scheduling information from the macro base station.

The UE 200 receives the scheduling information from the macro base station 214 on an extended control channel 216, e.g. regarding when to be scheduled to receive downlink data from the micro base station 204 and how the downlink data will be organised. The downlink data is typically received on a suitable downlink data channel 206 according to the scheduling information, e.g. a physical shared downlink data channel (PDSCH). The extended control channel may be implemented as a physical downlink control channel, comprising a cell indicator adapted to define the downlink data channel. The micro base station 204 transmits then the downlink data to the UE 200 according to the cell indicator.

For carrier aggregation a Carrier Indicator Held (CIO has been introduced as cell indicator for Physical Downlink Control Channel (PDCCH) signalling. The CIF consists of three bits attached to the Dynamic Carrier Indicator (DCI) message which points to the component carrier where the corresponding shared channel is located. For a downlink assignment the CIF points to the component carrier carrying the PDSCH whereas for an uplink grant the three bits are used to address the component carrier conveying Physical Uplink Shared Channel (PUSCH). In this example embodiment, the CIF is three bits, even though it could be optimized depending on the number of component carriers a terminal is configured with. If CIF is configured every downlink and uplink grant contains them even if the assignment addresses PDSCH within the component carrier (or PUSCH within the linked uplink component carrier for uplink grants).

Also for systems without carrier aggregation, the cell indicator may be used. It may then be used to inform the UE regarding which cell the UE is scheduled to transmit data to, or receive data from. It is also to be noted that the cell indicator of the extended control channel is not limited to a length of three bits, the skilled person may design the cell indicator alternatively within the inventive concept, e.g. with another suitable length.

Figure 2B:
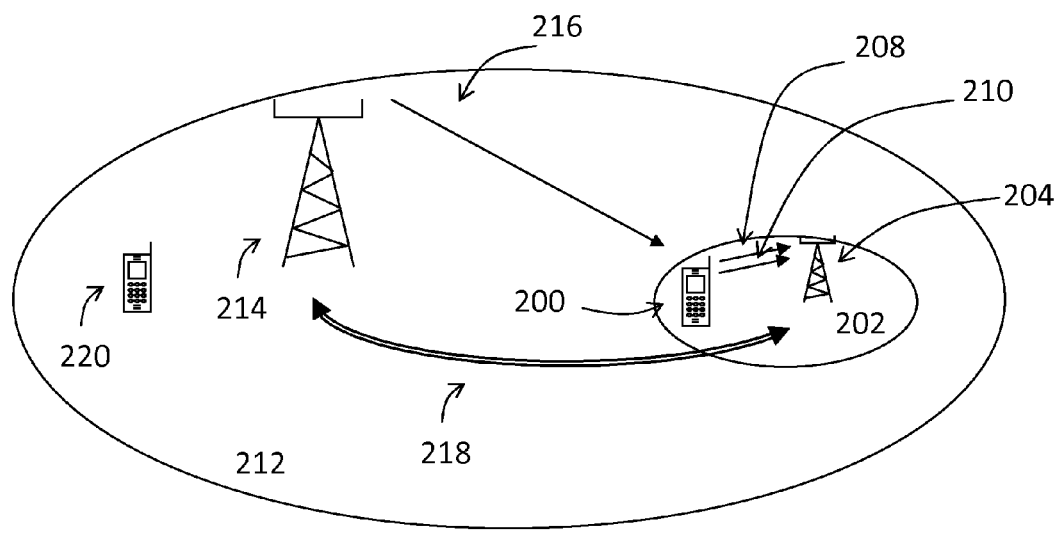

It is to be noted, that even if a micro cell 202, and a micro base station 204 are used in this example embodiment, a skilled person will realise that other smaller cells, such as pico cells or femto cells, may be used, and he/she is able to modify the UE and the base stations accordingly, within the described concept With reference to FIG. 2b, which illustrates a schematic overview, a scenario where a UE 200 is scheduled to transmit uplink data according to an example embodiment will now be described. In this example embodiment the UE 200 is scheduled to transmit uplink data to a micro base station 204. This example embodiment is based on the example embodiment described above and the same reference numbers are therefore used. Even in this example embodiment, other smaller cells may be used within the described concept, similarly to in the example embodiment described above.

The UE 200 is located in a micro cell 202 and is served by a micro base station 204. The micro cell 202 is embedded in a macro cell 212, i.e. the coverage area (smaller ellipsoid) of the micro base station 204 is located within the coverage area (larger ellipsoid) of a macro base station 214. The macro base station 214 serves other UE's 220 which are not served by the micro base station 204. The UE 200 sends a scheduling request to the micro base station 204, to schedule a transmission of uplink data on an uplink data channel 208 from the UE 200 to the micro base station 204. The micro base station 204 determines a suggested scheduling for the transmission of uplink data, e.g. by suggesting how the transmission will be organised, and sends a scheduling request to the macro base station 214 over a communication interface 218. In this example embodiment, the control channel 210 is implemented as a PDCCH, the uplink data channel 208 as a PUSCH and the interface as an X2 interface. However, a skilled person is not limited thereto; he/she may select other suitable communication channels and interfaces within the described concept.

The macro base station 214 determines scheduling information related to the communication of uplink data and transmits the scheduling information on an extended control channel 216 to the UE 200, correspondingly to what was described for downlink data in an example embodiment above. The scheduling information in the example embodiments described above may be implemented as a scheduling grant, containing information regarding which resource block(s) to use for transmission of uplink data and the format of the transmission.

The UE 200 receives the scheduling information from the macro base station 214 on an extended control channel 216, e.g. regarding when to be scheduled to transmit uplink data to the micro base station 204 and how the uplink data will be organised. The uplink data is typically received on a suitable uplink data channel 208 according to the scheduling information, e.g. a physical shared uplink data channel (PUSCH). The extended control channel may be implemented as a physical downlink control channel (PDCCH), comprising a cell indicator adapted to define the uplink data channel. The micro base station 204 receives then the uplink data from the UE 200 according to the cell indicator.

Typically, the micro base station 204 has better awareness of the uplink communication channel 208. By determining the suggested scheduling in an request action performed by the micro base station 204 and then determining and transmitting the scheduling information from the macro base station 214, the better awareness of the communication channel 208 may be applied when the macro base station aggregates the control data on only one control channel 216, resulting in less interference and better use of the communication channel 208. Correspondingly, in the downlink example embodiment described above, the micro base station 204 has better awareness of the downlink communication channel 206.

Since the micro base station 204 does not transmit any control channel of its own, the interference of the control channel 216 is lower than on the control channel 106 in FIG. 1. Furthermore, by distributing the control data from the micro base station 204, via the macro base station 214, the micro base station's better awareness of the communication resources in the overlapped micro cell 202 could be used when scheduling the communication between the UE and the micro base station 204. Therefore the macro base station 214 may adapt the scheduling of other UE's so as to reduce the interference on the data channels if necessary. For instance, the macro base station 214 may schedule a downlink data transmission to UE 220 on the same radio resource as base station 204 has scheduled a downlink transmission to UE 200, if the mutual interference between the two downlink data channels is low enough. The criterion for the scheduling decision may be any suitable Inter-Cell Interference Coordination (ICIC) algorithm.

Typically the control data, such as scheduling information, is more critical than the user data. It is therefore important to protect control channels from interference. For instance, depending on the specific radio propagation situation, it might be acceptable for the macro base station 214 and the micro base station 204 to schedule user data to two UE's 200, 220 on the same radio resource, but it might not be acceptable to schedule two control channels on the same radio resource. According to the proposed solution, the quality of the control channel is improved by aggregating the control traffic on the control channel 216, and at the same time a robust scheduling of radio resources for user data is made possible.

Additionally, in an alternative example embodiment, based on the example embodiments described above, the macro base station 214 is able to over-ride the requested scheduling received from the micro base station 204.

The macro base station 214 may also decide that the scheduling according to the scheduling request is not optimal, the scheduling which has been determined by the micro base station 204, and determine another over-riding scheduling of downlink data on the downlink data channel 206, and/or uplink data on the uplink data channel 208. Scheduling information in accordance with the over-riding scheduling is then sent to the UE 200 on the extended control channel 216, but also to the micro base station 204 via the communication interface 218. The micro base station 204 will then communicate user data (uplink or downlink) with the UE 200 according to the scheduling information received from the macro base station 214, i.e. in accordance with the over-riding scheduling.

Figure 3:
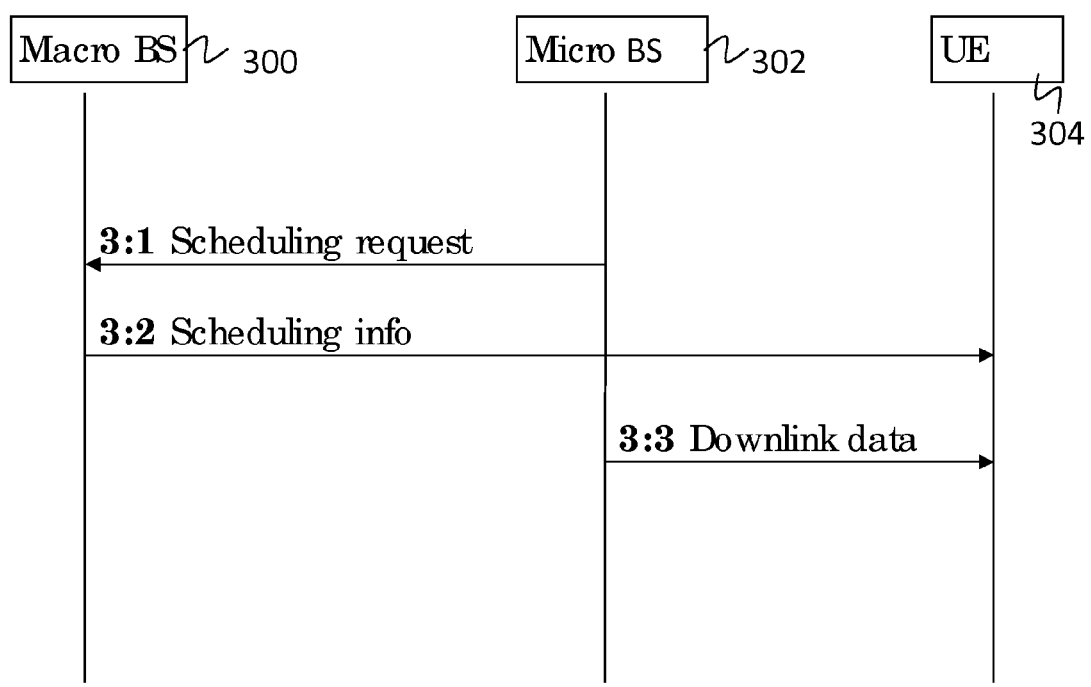
FIG. 3-4 are signalling charts illustrating scenarios according to some other example embodiments.

With reference to FIG. 3, which is a schematic signalling chart, a scenario in a communication network where a micro base station 302 sends downlink data to a UE 304 will now be described in accordance with an example embodiment for an LTE based system However, it is to be noted that the concept is not limited to LTE-based systems, UE's, micro base stations, and macro base stations. A skilled person may select other suitable communication networks, user terminals, and access nodes within the described concept. Such systems may be selected as Wimax, UMTS, etc, and the access nodes may be realised as macro, micro, pico, femto base stations, relays, repeaters, etc.

In a first action 3:1, the micro base station 302, having downlink data to transmit to the UE 304, initiates a transmission of the downlink data to the UE 304. The initiation is performed by suggesting that the transmission of the downlink data will be scheduled in a specific timeslot in a PDSCH, and sending a scheduling request to the macro base station 300. The scheduling request comprises the scheduling suggested by the micro base station 302. In this example embodiment the scheduling request is sent via an X2 interface from the micro base station 302 to the macro base station 304.

The macro base station 300 determines scheduling information based on the scheduling request, received from the micro base station 302, and sends the scheduling information to the UE 304 in a following action 3:2. In this example embodiment, the scheduling information in action 3:2 is transmitted over an extended control channel. As described in an example embodiment above, the extended control channel is implemented as a physical downlink control channel, comprising a cell indicator, e.g. CIF adapted to define the downlink data channel. In a final action 3:3, the downlink data is sent from the micro base station 302 to the UE 304 according to the scheduling information determined in action 3:2.

By determine a suggested scheduling in the micro base station 302, sending a scheduling request to the macro base station 300, determining scheduling information based on the scheduling request, and transmitting the scheduling information from the macro base station 300, the macro base station 300 is enabled to aggregate and co-ordinate transmission of scheduling information on the extended control channel to UE's 304 located in the coverage area of the macro base station 300. Thereby, interference from data channels for UE's 304 located in the coverage area of the macro base station 300 may be decreased/avoided. As described below, the macro base station 300 may either determine the scheduling information in accordance with the scheduling request, i.e. the suggested scheduling determined by the micro base station 302, or in accordance with an over-riding scheduling determined in the macro base station 300. The micro base station 302 may have better awareness of the channel quality and may use this awareness for determining a scheduling. Thus, with the method of the example embodiment, local awareness of the communication channel may be applied, and interference of the signalling of scheduling information will be decreased.

Moreover, in an alternative example embodiment based on the one above, the macro base station 300 may determine an over-riding scheduling and transmit scheduling information in accordance with the over-riding scheduling, as describe in an example embodiment above. In that case, the scheduling information of action 3:2 is also sent to the micro base station 302 (not shown), to enable communication of user data according to the over-riding scheduling.

Figure 4:
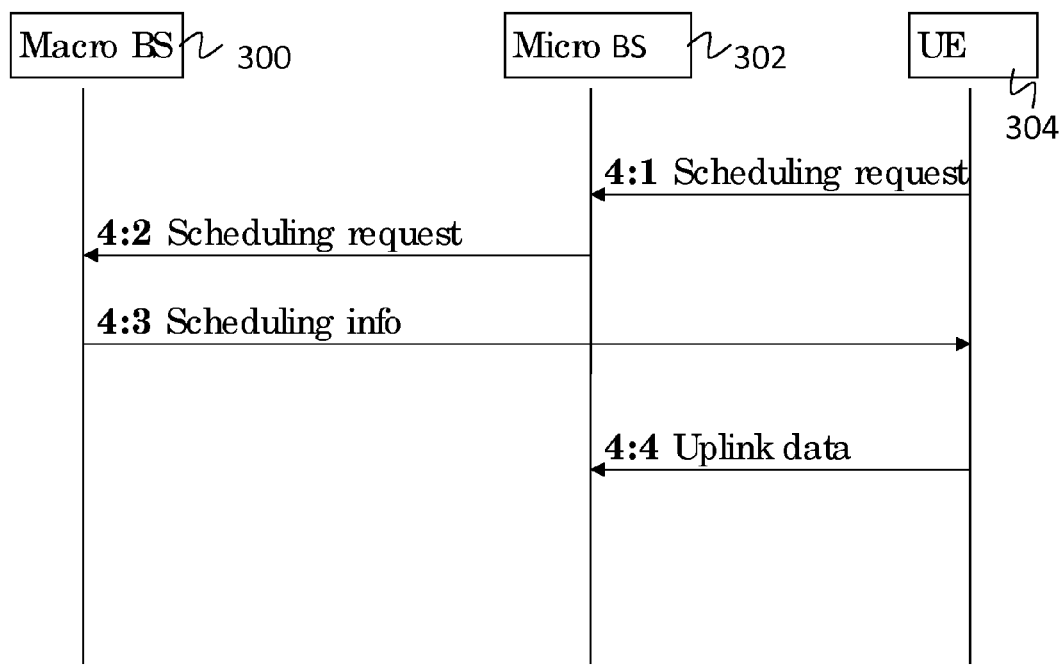

With reference to FIG. 4, which is a schematic signalling chart, a scenario in a communication network where a UE 304 sends uplink data to a micro base station 302 will now be described in accordance with an example embodiment. The communication network comprises also a macro base station 300. This example embodiment corresponds to the example embodiment describe above, but illustrates instead the situation in uplink. Because this example embodiment corresponds to the example embodiment described with reference to FIG. 3, but for uplink instead of downlink, the corresponding reference numbers are applied for the base stations 300, 302 and the UE 304.

The actions 4:2, 4:3, and 4:4 corresponds to the actions 3:1, 3:2, 3:3, respectively, but differs in that they relate to transmission of uplink data instead of downlink data. However, the scenario of this example embodiment further comprises the additional initial action 4:1, executed before action 4:2, where the UE 304, which has uplink data to transmit to the micro base station 302, sends a request to be scheduled to transmit uplink data to the micro base station 302. In this example embodiment, the request to be scheduled to transmit uplink data is sent on a PUCCH. Furthermore, the action 4:2 differs from action 3:1 in the above described example embodiment, in that the micro base station 302 determines a suggested scheduling upon reception of the request to transmit of action 4:1. The action 4:3 differs from action 3:2 in that the scheduling information, received on the extended control channel and comprising the cell indicator, relates to transmission of uplink data. Moreover, the action 4:4 differs from the action 3:3 in that uplink data is transmitted from the UE 304 to the micro base station 302, instead of downlink data from the micro base station 302 to the UE 304. The uplink data is sent on a PUSCH in this example embodiment.

By letting the micro base station 302 determine a suggested scheduling, but determining the signalling scheduling information in the macro base station 300 and send the scheduling information from the macro base station 300, the macro base station 300 is enabled to aggregate control data for the user data transmission with control data for other embedded cells. Interference between control channels in different embedded cells can then be avoided.

In an alternative example embodiment, based on the one above, the macro base station 300 may determine an over-riding scheduling and determine the scheduling information in accordance with the over-riding scheduling, correspondingly to what is described above in another example embodiment. Correspondingly, even in this alternative example embodiment, the determined scheduling information will be transmitted also to the micro base station 302 in step 4:3.

Figure 5:
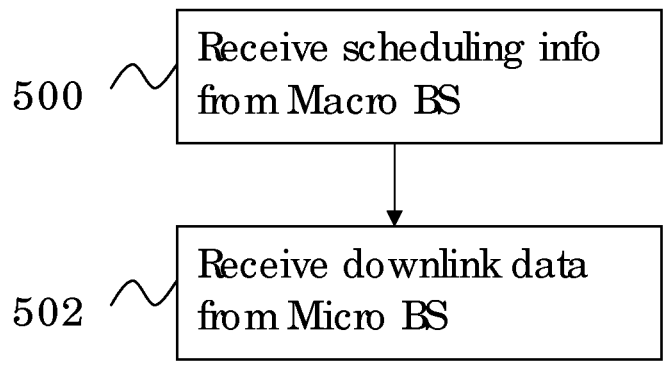
FIG. 5-6 are flow chart illustrating methods in UE's according to further example embodiments.

With reference to FIG. 5, which is a schematic flow chart, a method in a UE for receiving downlink data from a first base station will now be described according to an example embodiment. The UE is served by the first base station, but the coverage area of the first base station is located within, or partially within the coverage area of a second base station, i.e. the coverage area of the second base station overlaps the coverage area of the first base station. In this example embodiment, the first base station is implemented as a micro base station and the second base station as a macro base station. However, a skilled person realises that any suitable base stations where the first one is a low power base station and the second one is a high power base station may be applied in the manner described. For instance, pico-, or femto base stations may be applied.

In a first action 500, the UE receives scheduling information from the second base station on an extended control channel. In this example embodiment the extended control channel is implemented as a physical downlink control channel, comprising a CIF, which defines the reception of downlink data, i.e. similar to in an example embodiment describe above. For instance, the CIF defines on which component carriers the downlink data channel is located, or which UE who will receive the downlink data. The UE receives then the downlink data on the downlink data channel from the first base station according to the scheduling information in a following action 502. The downlink data channel used is typically implemented as a PDSCH.

However, it is to be noted that even if the example embodiment relates to an LTE-based system, the skilled person realises easily how to modify the method actions to be applied in any other suitable heterogeneous cellular communication network.

Figure 6:
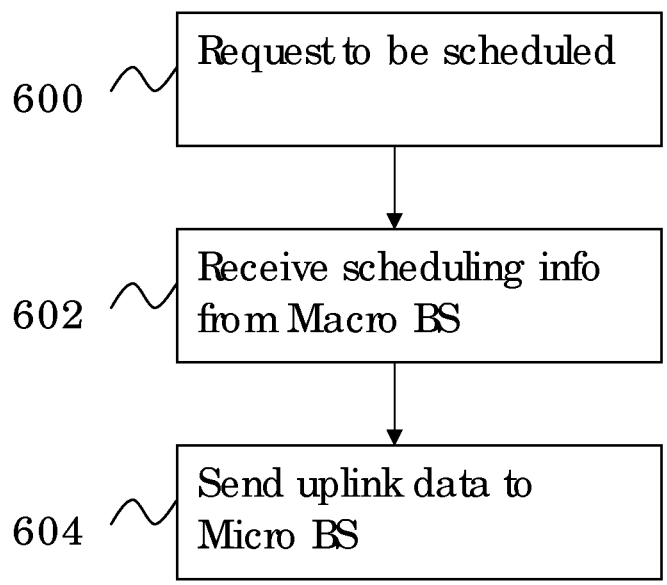

With reference to FIG. 6, which is a schematic flow chart, a method in a UE for transmitting uplink data to a first base station will now be described according to an example embodiment Correspondingly, to the example embodiment described above, the UE is served by the first base station, but the coverage area of the first base station is located within or partially within the coverage area of a second base station. Furthermore, the skilled person realises that alternative base stations may be used, as described in the example embodiment above.

Ina first action 600, the UE transmit a request to the first base station to be scheduled to transmit uplink data to the first base station. The request is typically sent on a PUCCH to the first base station, which will determine a suggested scheduling and send a scheduling request to the second base station, the scheduling request comprising the suggested scheduling. Ina following action 602, the UE receives scheduling information being determined and sent from the second base station, the scheduling information being related to the transmission of uplink data and is implemented as a scheduling grant. The scheduling information is received on an extended control channel from the second base station which has determined the scheduling requested by the first base station. Even in this example embodiment, the signalling information comprises a cell indicator.

The UE transmits then the uplink data on the uplink data channel to the first base station according to the scheduling information in a final action 604. The used uplink data channel is typically implemented as a PDSCH.

Figure 7:
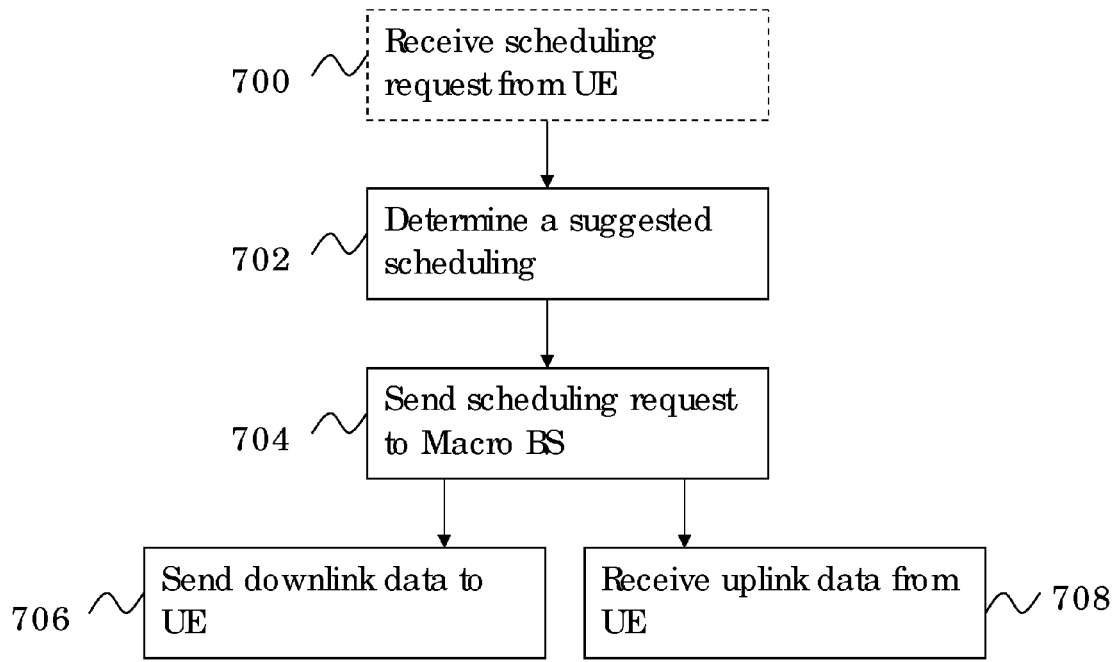
FIG. 7-8 are flow charts illustrating methods in access nodes according to further example embodiments.

With reference to FIG. 7, which is a schematic flow chart, a method in a first base station for transmitting downlink data to a UE will now be described according to an example embodiment Correspondingly, to in the example embodiment described above, the first base station serves the UE, but the coverage area of the first base station is located within the coverage area of a second base station. Furthermore, the skilled person realises that alternative base stations may be applied, as described in the example embodiments described above.

In an action 702, the first base station determines a suggested scheduling of the transmission of downlink data to the UE for instance, the first base station may decide that the downlink data shall be transmitted in a specific resource block to the UE. In a following action 704, the first base station sends a scheduling request to the second base station to provide scheduling information based on the scheduling request, which will be describe in another example embodiment. The scheduling request comprises the suggested scheduling which was determined by the first base station. Finally, in another action 706, the first base station transmit downlink data to the UE according to the scheduling information, which in this example embodiment corresponds to the suggested scheduling of action 702. In this example embodiment, the scheduling request is communicated via an X2 interface between the first and the second base stations, and the downlink data is transmitted on a PDSCH in an LTE-based system. However, the skilled person realises that the described concept may be applied in other systems, e.g.

UMTS. He/she is also capable to modify the described actions accordingly and select suitable communication and signalling channels.

In an alternative example embodiment, based on the one above and also described with reference to FIG. 7, the first base station receives uplink data from the UE.

In a first action 700 (illustrated with a dotted line), the first base station receives a scheduling request from the UE, e.g. on a PUCCH. In this example embodiment, the actions 702 and 704, respectively, differs from the example embodiment above, in that the suggested scheduling and the scheduling request relates to transmission of uplink data instead of downlink data. Furthermore, is the suggestion of the scheduling in action 702 triggered by the scheduling request of action 700. It is to be denoted that the scheduling request received in action 700, typically is not corresponding with the scheduling request sent in action 704.

In a final action 708, executed instead of action 706, the first base station receives uplink data from the UE according to the scheduling information.

In another alternative example embodiment, based on some example embodiments described above, the suggested scheduling determined in action 702 will be over-ridden by the second base station by any reason. The second base station transmits scheduling information based on the over-riding scheduling, which over-fides the suggested scheduling determined by the first base station, as described in an example embodiment above. The first base station receives then scheduling information (not shown in figure), which differs from the suggested scheduling according to the scheduling request sent in action 704 in the example embodiment described above. The scheduling information is received via the X2 interface.

Finally, the downlink data in action 706 is transmitted based on the scheduling information according to the scheduling which over-fides the decided scheduling of action 702. Correspondingly, the uplink data in action 708 is received based on the over-riding scheduling information.

Figure 8:
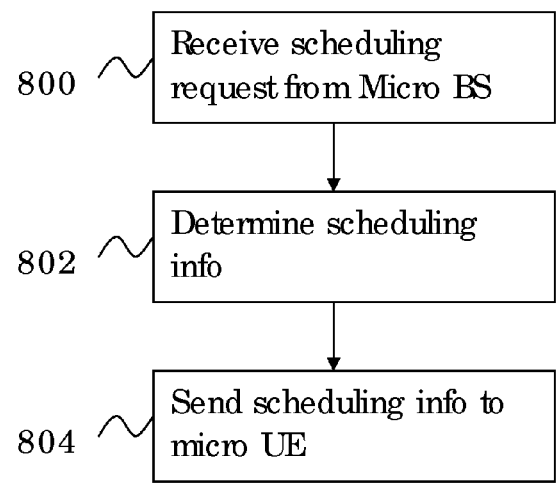

With reference to FIG. 8, which is a schematic flow chart, a method in a second base station for enabling communication of data between a UE and a first base station will now be described according to an example embodiment. Correspondingly, to the example embodiments described above, the first base station serves the UE, but the coverage area of the first base station is located within the coverage area of a second base station.

In a first action 800, the second base station receives a scheduling request from the first base station, the scheduling request being related to transmission of downlink data from the first base station to the UE. The scheduling request comprises a suggested scheduling of the communication, the scheduling suggested scheduling being decided by the first base station. The second base station determines scheduling information based on the received scheduling request in a following action 802, and transmit the scheduling information to the UE in another action 804. Determining scheduling information based on the scheduling request, is in this example embodiment performed by either determining the scheduling information in accordance with the suggested scheduling, or by determining an over-riding scheduling and determining the scheduling information in accordance with the over-riding scheduling. The scheduling information is in this example embodiment implemented as a scheduling grant comprising a cell indicator, e.g. CIF and is sent on an extended control channel to the UE. The first base station and the UE are then enabled to communicate downlink data related to the scheduling information sent in action 804. The scheduling request in action 802 is typically sent via the X2 interface, and the scheduling information in action 804 is transmitted on an extended control channel, as described in an example embodiment above.

Moreover, the skilled person is capable to modify the method in the second base station to enable uplink data to be transmitted from the UE to the first base station. The scheduling request in action 800, the determination of scheduling information in action 802, and the transmission of scheduling information in action 804 relates then to communication of uplink data instead of downlink data.

Correspondingly, to the example embodiment described above, the second base station may over-fide the suggested scheduling when determining scheduling information, and send scheduling information according to the over-riding scheduling to both the UE and to the first base station. Typically, the scheduling information is then sent via the X2 interface to the first base station, and via the extended control channel (comprising the CIO to the UE.

Figure 9:
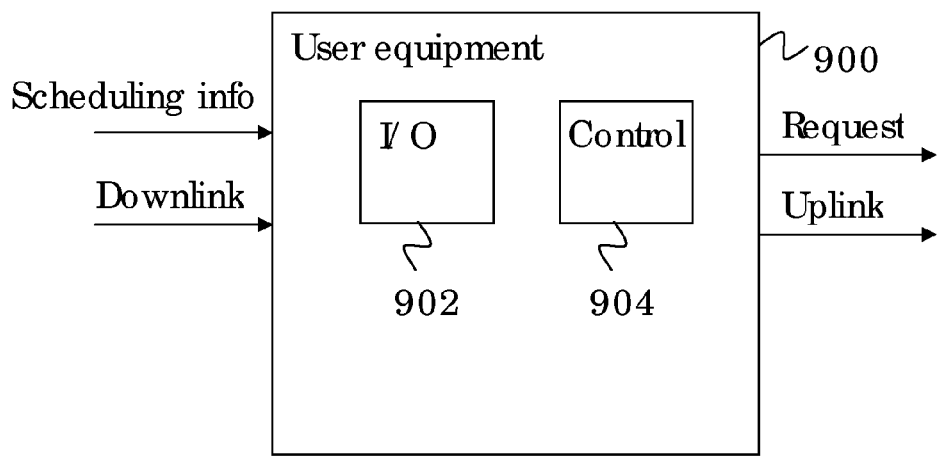
FIG. 9 is a block diagram illustrating a UE according to another example embodiment.

With reference to FIG. 9, which is a schematic block diagram, a UE 900 will now be described in accordance with an example embodiment. The UE 900 is adapted to receive downlink data from a first base station, and/or send uplink data to the first base station, in a heterogeneous communication network which further comprises a second base station. The coverage area of the first base station is surrounded by the coverage area of the second base station, or the coverage area of the first base station partially overlaps the coverage area of the second base station, as described in an example embodiment above.

The UE 900 comprises a transceiver 902 and a controller 904. The controller 904 is adapted to receive scheduling information on an extended control channel from the second base station related to the reception of downlink data or transmission of uplink data, and the transceiver 902 is adapted to receive downlink data from the first base station and/or transmit uplink data to the first base station according to a cell indicator comprised in the scheduling information.

The controller 904 is further adapted to transmit a first request to be scheduled to transmit uplink data to the first base station. The first request will be transmitted to the first base station which will determine a suggested scheduling for the transmission of uplink data and transmit the suggested scheduling to the second base station, as a second scheduling request. Furthermore, the controller 904 is adapted to transmit the first scheduling request on a PUCCH, and the transceiver 902 is adapted to receive downlink data on a PDSCH and transmit uplink data on a PUSCH.

Figure 10:
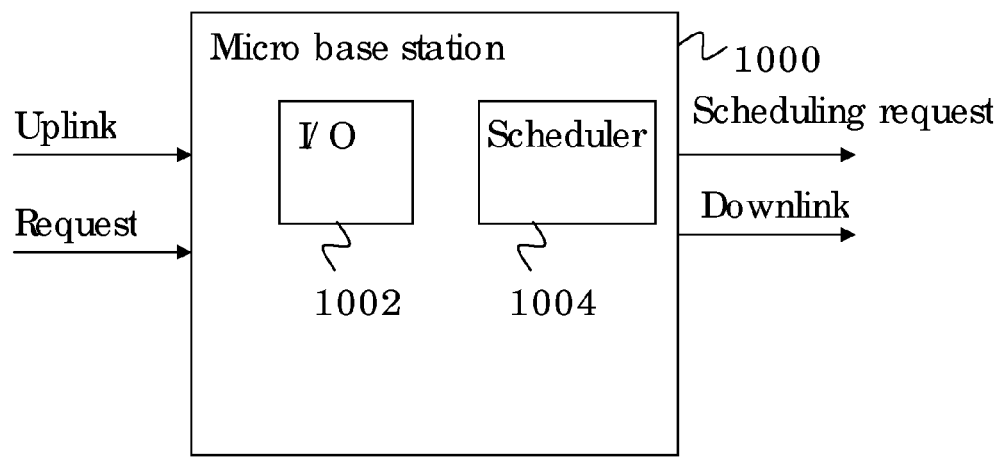
FIG. 10-11 are block diagrams illustrating base stations according to further example embodiments.

With reference to FIG. 10, which is a schematic block diagram, a micro base station 1000 will now be described in accordance with an example embodiment. The micro base station 1000 is adapted to transmit downlink data to a UE, and/or receive uplink data from the UE, in a heterogeneous communication network further comprising a second base station. The coverage area of the first base station is surrounded by the coverage area of the second base station, or partially overlaps the coverage area of the second base station, as described in an example embodiment above.

The micro base station 1000 comprises a transceiver 1002 and a scheduler 1004. The scheduler 1004 is adapted to determine a suggested scheduling of communication of user data in uplink and/or downlink between the micro base station and the UE. When determining the scheduling, the scheduler 1004 suggests a communication resource, e.g. one or more component carriers or resource blocks, for the communication and sends a second scheduling request to the macro base station, to be used when determining scheduling information.

The transceiver 1002 is adapted to transmit downlink data to the UE and/or receive uplink data from the UE according to a cell indicator comprised in the scheduling information.

The scheduler 1004 is further adapted to receive a first request to be scheduled to transmit uplink data to the first base station. The first request will be received from the UE and the determining of a scheduling suggestion will be triggered by the first scheduling request. Furthermore, the scheduler 1004 is adapted to receive the first scheduling request on a PUCCH, and the transceiver 1002 to transmit downlink data on a PDSCH and receive uplink data on a PUSCH.

Additionally, as described in an example embodiment above, the suggested scheduling being determined by the first base station may be over-ridden by the second base station. The scheduler 1004 is then configured to receive scheduling information according to the over-riding scheduling from the second base station via the X2 interface, and the transceiver 1002 is then configured to transmit the downlink data and receive the uplink data according to the received over-riding scheduling information.

Figure 11:
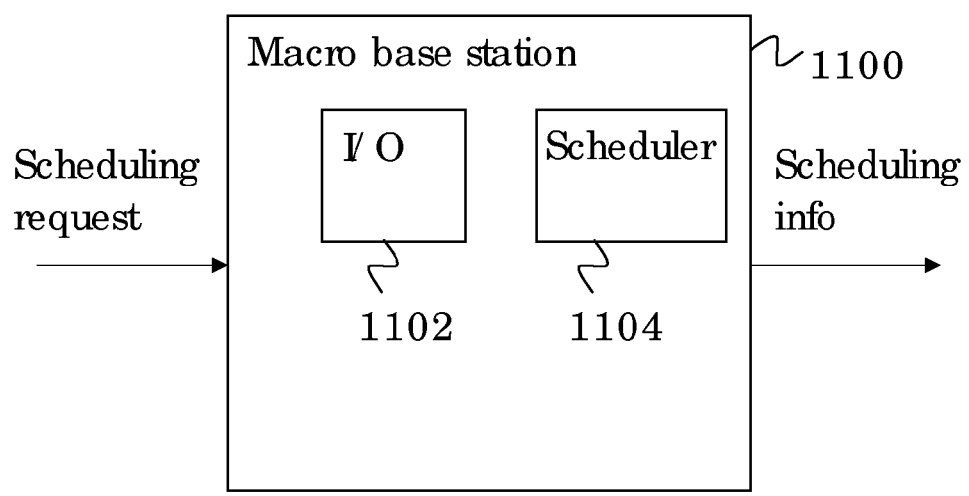

With reference to FIG. 11, which is a schematic block diagram, a macro base station 1100 will now be described in accordance with an example embodiment. The macro base station 1100 is adapted to enable communication of downlink data or uplink data between a UE and a micro base station in a heterogeneous communication network, which further comprises a second base station. The coverage area of the first base station is surrounded by the coverage area of the second base station, or partially overlaps the coverage area of the second base station, as described in an example embodiment above.

The macro base station 1100 comprises a transceiver 1102 and a scheduler 1104. The transceiver 1102 is adapted to receive the scheduling request from the micro base station and transmit the scheduling information to the UE. The scheduler 1104 is adapted to determine scheduling information in accordance with scheduling of communication of user data in uplink and/or downlink between the micro base station and the UE, the scheduling being requested by the micro base station. After having determined scheduling information, the scheduler 1104 sends the scheduling information to the UE on an extended control channel. The scheduling information is in this example embodiment implemented as a scheduling grant and a cell indicator. In this example embodiment the transceiver 1102 receives the scheduling request via an X2 interface from the micro base station, and transmits the scheduling information on the extended control channel.

Additionally, as described in an example embodiment above, the scheduling decided by the first base station may be over-ridden. The scheduler 1104 may therefore be configured to transmit a second scheduling which differs from the suggested scheduling according to the scheduling request. The scheduler 1104 is then configured to determine scheduling information according to the over-riding scheduling. The over-riding scheduling information will then be transmitted to the UE via an extended control channel, and to the first base station via the X2 interface.

It should be noted that FIGS. 9-11 merely illustrates various functional unit in the UE 900, and the base stations 1000 and 1100, respectively, in a logical sense, although the skilled person is free to implement these functions in practice using any suitable software and hardware means. Thus, the example embodiments described above are to be seen as examples, and a skilled person is not limited to the shown structure of the UE 900 and the base stations 1000 and 1100, respectively. For instance, their functional unit may be configured to operate according to the methods and procedures described above for FIGS. 3-8, where appropriate. For instance, any functionality in a specific functional unit may be placed in another suitable functional unit, where appropriate.

Furthermore, it is to be understood that the UE and the base stations described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the terminating services has been omitted in the figures, and will not be discussed in any further detail in this description.

Although procedures and communications network nodes for enabling communication of data on a shared channel between an embedded micro base station and a UE in an LTE system, are described in the example embodiments above, the concept is not limited thereto. The described procedures and network nodes can easily, as is realised by one skilled in the art, be adapted to be applied to any suitable heterogeneous communication networks with smaller cells embedded by larger overlaying cells, e.g. in LTE Advanced, UMTS-based systems or Wimax-based systems.

Moreover, even if the micro cells of the exemplifying embodiments are illustrated as being embedded/surrounded by the respective macro cells, the concept is not-limited thereto. The skilled person realises that the heterogeneous system may be arranged alternatively within the concept For instance, the coverage area of a micro cell and the coverage area of a macro cell may be arranged as partially overlapping each other.

The concept is generally defined by the following independent claims. Exemplifying embodiments are defined by the independent claims.

ABBREVIATIONS

CIF Carrier Indicator Field
DCI Dynamic Carrier Indicator
ICIC Inter-Carrier Interference Coordination.
PDCCH Physical Downlink Control CHannel
PDSCH Physical Downlink Shared CHannel
PUCCH Physical Uplink Control CHannel
PUSCH Physical Uplink Shared CHannel
LTE 3GPP long Term Evolution
UMC Universal Mobile Telecommunications System

The invention claimed is:

1. A method in a User Equipment (UE) for communicating user data between the UE and a first base station in a cellular communication network that further comprises a second base station connected to the first base station via a communication interface, the method comprising:
receiving from the second base station scheduling information for the communication of user data between the first base station and the UE; and
receiving user data from the first base station according to the scheduling information, or transmitting user data to the first base station according to the scheduling information,
wherein for the case of transmitting user data to the first base station according to the scheduling information, transmitting an uplink scheduling request to the first base station and receiving the scheduling information from the second base station in response to the uplink scheduling request.

2. The method according to claim 1, wherein the scheduling information defines one or more resource blocks to be used for receiving user data from the first base station, or one or more resource blocks to be used for transmitting user data to the first base station.

3. The method according to claim 1, wherein the scheduling information comprises a cell identity of the first base station and is received on a control channel of the second base station comprising a carrier identification field that indicates the cell identity, wherein the method includes the UE determining from the cell identity that the scheduling information is for the first base station, and wherein downlink user data is received by the UE based on the cell identity, or uplink user data is transmitted by the UE based on the cell identity.

4. A User Equipment (UE) configured to enable communication of user data between the UE and a first base station in a cellular communication network that further comprises a second base station connected to the first base station via a communication interface, the UE comprising:
  a controller configured to receive scheduling information from the second base station, the scheduling information being for the communication of user data between the UE and the first base station; and
  a transceiver configured to transmit uplink user data to the first base station according to the scheduling information, or receive downlink user data from the first base station according to the scheduling information,
  wherein the controller is configured to, for the case of transmitting uplink user data to the first base station according to the scheduling information, transmit an uplink scheduling request to the first base station and receive the scheduling information from the second base station in response to the uplink scheduling request.

5. The UE according to claim 4, wherein the controller is configured to determine one or more resource blocks based on the scheduling information and the transceiver is configured to use the one or more resource blocks for transmitting or receiving user data, to or from the first base station.

6. The UE according to claim 4, wherein the controller is configured to receive the scheduling information on a control channel of the second base station, the scheduling information comprising a cell identity of the first base station, wherein the control channel comprising a carrier identification field that indicates the cell identity, and wherein the controller is configured to determine from the cell identity that the scheduling information is for the first base station and the transceiver is configured to receive user data from the first base station, based on the cell identity, or transmit user data to the first base station, based on the cell identity.

7. A method in a first base station for communicating user data between the first base station and a UE in a cellular communication network that further comprises a second base station connected to the first base station via a communication interface, the method comprising:
  determining a suggested scheduling for transmitting user data to the UE from the first base station, or for receiving user data from the UE at the first base station;
  transmitting to the second base station a scheduling request indicating the suggested scheduling;
  receiving scheduling information from the second base station in response to the scheduling request, said scheduling information indicating a second scheduling that accords with or overrides the suggested scheduling; and
  transmitting user data to the UE from the first base station according to the second scheduling, or receiving user data from the UE at the first base station, according to the second scheduling.

8. The method according to claim 7, wherein the scheduling information comprises a cell identity and is received via the communication interface, and user data is transmitted to the UE according to the cell identity.

9. The method according to claim 7, further comprising, when the first base station is to receive user data from the UE, receiving a scheduling request from the UE at the first base station, and wherein determining the suggested scheduling of transmitting or receiving user data is triggered by the received scheduling request.

10. The method according to claim 7, wherein the communication interface is implemented as an X2 interface.

11. The method according to claim 7, wherein the determining of scheduling comprises determining one or more resource blocks to be used when transmitting user data to the UE from the first base station, or to be used when receiving user data from the UE at the first base station.

12. A first base station for enabling communication of user data between the first base station and a UE in a cellular communication network that further comprises a second base station connected to the first base station via a communication interface, the first base station comprising:
  a scheduler configured to determine a suggested scheduling for transmitting user data to the UE from the first base station, or for receiving user data from the UE at the first base station;
  a transceiver configured to transmit to the second base station a scheduling request based on the suggested scheduling and receive scheduling information from the second base station in response to the scheduling request, said scheduling information indicating a second scheduling that accords with or overrides the suggested scheduling; and
  wherein the transceiver is configured to perform at least one of:
    transmit user data to the UE from the first base station according to the second scheduling; and
    receive user data from the UE at the first base station according to the second scheduling.

13. The first base station according to claim 12, wherein the transceiver is configured to receive a scheduling request from the UE when the first base station is to receive user data, and wherein receiving the scheduling request triggers the transceiver to determine the suggested scheduling.

14. The first base station according to claim 12, wherein the communication interface is implemented as an X2 interface.

15. A method in a second base station for enabling communication of user data between a UE and a first base station in a cellular communication network that further comprises the second base station, the second base station being connected to the first base station via a communication interface, and the method comprising:
  receiving from the first base station a scheduling request indicating a suggested scheduling determined by the first base station, the suggested scheduling concerning the communication of user data between the first base station and the UE;
  determining scheduling information in response to the scheduling request, wherein the scheduling information comprises a second scheduling that accords with or overrides the suggested scheduling; and
  transmitting the scheduling information to the UE and to the first base station.

16. The method according to claim 15, further comprising determining whether the second scheduling should accord with or override the suggested scheduling in dependence on inter-cell interference coordination by the second base station with respect to coverage areas or cells associated with at least the first and second base stations.

17. The method according to claim 15, wherein transmitting the scheduling information to the UE comprises transmitting the scheduling information over an extended control channel and indicating to the UE that the scheduling information pertains to the first base station by indicating a cell identity of the first base station in a carrier indication field of the extended control channel.

18. The method according to claim 15, wherein transmitting the scheduling information to the first base station comprises sending the scheduling information to the first base station via an X2 interface, as said communication interface.

19. A second base station for enabling communication of user data between a UE and a first base station in a cellular communication network that further comprises the second base station, the second base station being connected to the first base station via a communication interface, and the second base station comprising:
 a transceiver configured to receive from the first base station a scheduling request in accordance with a suggested scheduling, the suggested scheduling concerning the communication of user data between the UE and the first base station; and
 a scheduler configured to determine the scheduling information in response to the scheduling request, wherein the scheduling information comprises a second scheduling that accords with or overrides the suggested scheduling;
 wherein the second base station is configured to transmit the scheduling information to the UE and to the first base station.

20. The second base station according to claim 19, wherein the scheduler is configured to determine whether the second scheduling should accord with or override the suggested scheduling in dependence on inter-cell interference coordination by the second base station with respect to coverage areas or cells associated with at least the first and second base stations.

21. The second base station according to claim 19, wherein the second base station is configured to transmit the scheduling information to the UE over an extended control channel and to indicate to the UE that the scheduling information pertains to the first base station by indicating a cell identity of the first base station in a carrier identification field of the extended control channel.

22. The second base station according to claim 19, wherein the second base station is configured to transmit the scheduling information to the first base station over an X2 interface, as said communication interface.

* * * * *